United States Patent Office 2,920,038
Patented Jan. 5, 1960

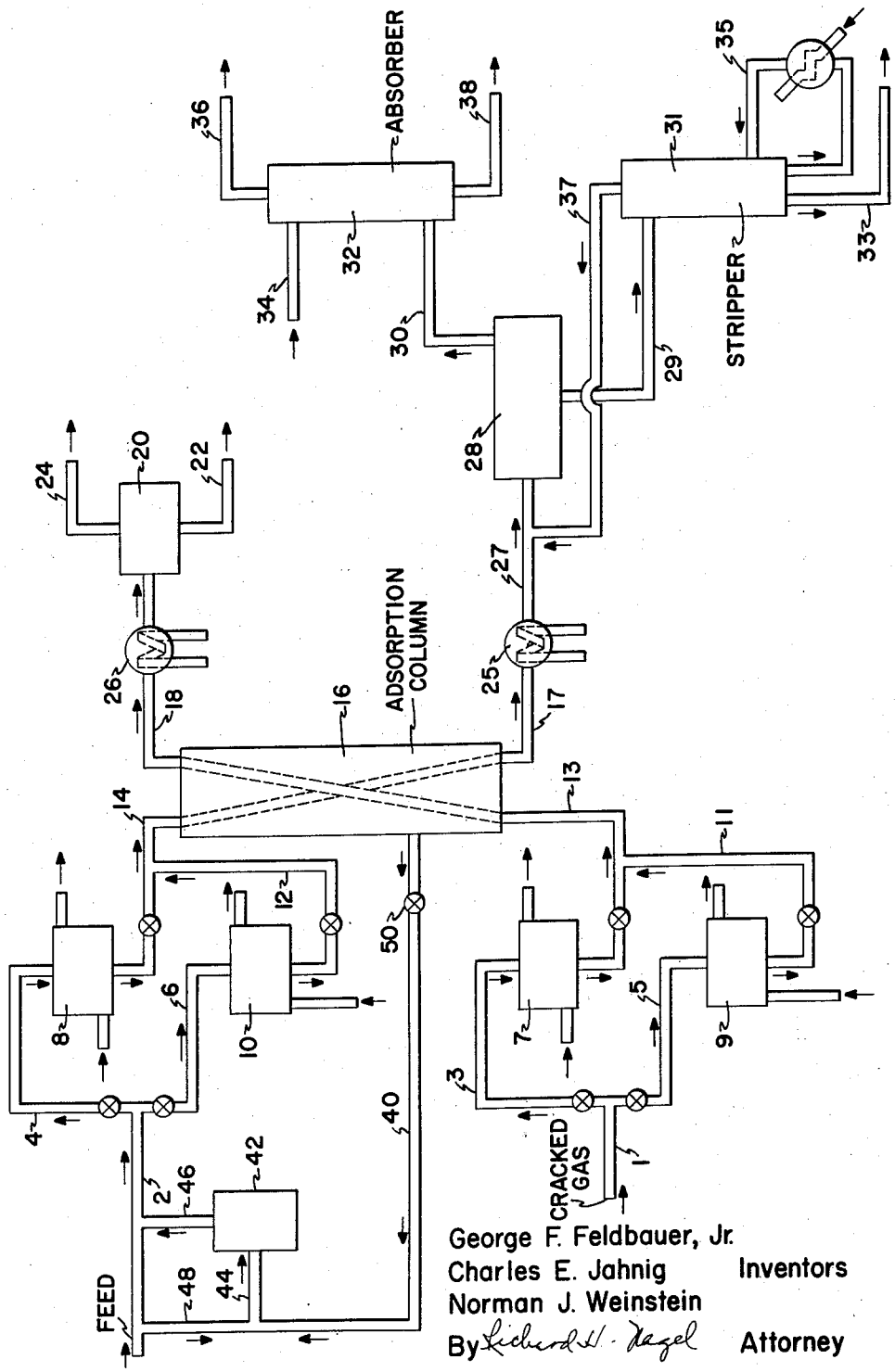

2,920,038

GASOLINE HYDROCARBON SEPARATION RECOVERY PROCESS UTILIZING MOLECULAR SIEVES

George F. Feldbauer, Jr., Cranford, Charles E. Jahnig, Rumson, and Norman J. Weinstein, Newark, N.J., assignors to Esso Research and Engineering Company, a corporation of Delaware Application December 5, 1956, Serial No. 626,358

9 Claims. (Cl. 208—310)

The present invention relates to a process for separating and segregating straight chained hydrocarbons from mixtures thereof with branched chain or cyclic hydrocarbons. More particularly, the present invention relates to the separation of relatively straight chain hydrocarbons from branched chain isomers employing a class of natural or synthetic adsorbents termed, because of their crystalline patterns, molecular sieves. Still more particularly, the present invention relates to an improved desorption process whereby the hydrocarbon adsorbed on the sieve is recovered in a manner resulting in higher recovery in a higher state of purity and adsorbent efficiency than hitherto found possible.

It has been known for some time that certain zeolites, both naturally-occurring and synthetic, have the property of separating straight chain from branched chain hydrocarbon isomers, as well as from cyclic and aromatic compounds. These zeolites have innumerable cavities with entrance pores of uniform size, and only molecules small enough to enter the pores can be adsorbed. The pores may vary in diameter from 3 or 4 Angstroms to 15 or more, but it is a property of these zeolites that any particular sieve has pores of a substantial uniform size.

The scientific and patent literature contains numerous references to the sorbing action of natural and synthetic zeolites. Among the natural zeolites having this sieve property may be mentioned chabasites. A synthetic zeolite with molecular sieve properties is described in U.S. 2,442,191. Zeolites vary somewhat in composition, but generally contain the elements of silicon, aluminum and oxygen as well as an alkali and/or an alkaline earth element, e.g. sodium and/or calcium. The naturally occurring zeolite analcite, for instance, has the empirical formula $NaAlSi_2O_6 \cdot H_2O$. Barrier (U.S. 2,306,610) taught that all or part of the sodium is replaceable by calcium to yield, on dehydration, a molecular sieve having the formula $(Ca, Na_2) Al_2Si_4O_{12} \cdot 2H_2O$. Black (U.S. 2,522,426) describes a synthetic molecular sieve zeolite having the formula $4CaO \cdot Al_2O_3 \cdot 4SiO_2$. A large number of other naturally-occurring zeolites having molecular sieve activity, i.e. the ability to adsorb a straight chain hydrocarbon and exclude the branch chain isomers due to differences in molecular size, are described in an article "Molecular Sieve Action of Solids" appearing in Quarterly Reviews, vol. III, pages 293–320 (1949), published by the Chemical Society (London).

The segregation or removal of branched chain or straight chain isomers from hydrocarbon mixtures, either for the purpose of enriching the mixture in branched chain components or for isolating and recovering straight chain isomers has become increasingly important in industry with the growing realization that the activity, potency and desired physical property of a product may depend upon the specific structure of the various possible hydrocarbons utilizable as reactants in the preparation or manufacture of the final product. Thus in the preparation of high octane fuels, the presence of paraffinic straight chain hydrocarbons makes for a lower octane fuel. On the other hand, in the manufacture of synthetic detergents such as the alkyl aryl sulfonates, a straight chain nuclear alkyl substituent confers better detergency characteristics than a branched chain isomer. Numerous other examples might be cited.

Though it has in the past been proposed to make these separations, i.e. of straight chain from branched chain and cyclic hydrocarbons by molecular sieves, and though excellent and selective separations have been realized, a serious problem has arisen when it was attempted to recover the adsorbed material and to regenerate the molecular sieve or zeolite. The conventional means described in the art are steaming, purging with nitrogen or methane, evacuation, or the like. In commercial installations, it is necessary to employ a cyclic operation, i.e. an adsorption step followed by desorption and regeneration of the sieve, and thereafter another adsorption step. It has been found that regeneration by the conventional methods of heating, evacuation, steaming and the like result in a marked decline in the adsorptive capacity of the sieves. For instance, in a process wherein a virgin naphtha fraction was treated with a synthetic molecular sieve having a pore diameter of 5 Angstroms to separate straight from branched chain and cyclic constituents, and the sieves desorbed and regenerated between cycles by steam stripping followed by nitrogen flushing, the sieves decreased in capacity to 59% of fresh capacity after only three cycles. Similarly, the effect of continued treatment of the sieves with steam at the high stripping temperature causes them to deteriorate.

Substantially improved desorption has been realized when there is employed as a desorbent and regenerating means a low boiling, preferably gaseous olefin, which is itself in turn readily desorbed, at the end of the desorbing cycle, by the higher molecular weight normal paraffins. Though ethylene, propylene and n-butylene may be used, propylene has been found to be the preferred desorption agents for n-paraffins boiling within the light gasoline boiling range. Vapor phase adsorption of n-hydrocarbons from their mixtures, and olefin desorption are preferred, and it is generally desirable to carry out both cycles at substantially the same temperature.

An important problem associated with an economic olefin desorption process is the recovery and re-use of the olefinic desorbent. Thus, in the cyclic operation briefly outlined above, the effluent from a molecular sieve adsorption zone contains, during the n-paraffin adsorption part of the cycle, a mixture of n-paraffin-free hydrocarbons and olefin. This vaporous mixture must be separated, and fractionation requires either compression or refrigeration, both of which are costly and require expensive installations.

It is therefore the principal purpose of the present invention to set forth an improved method of desorbing and stripping hydrocarbons adsorbed with uniform pores and cavities of certain natural or synthetic zeolites, commonly called molecular sieves, in a manner more economic than hitherto found possible.

It is also a purpose of the present invention to provide desorption means which prolong substantially the life of the molecular sieve adsorbent.

It is a still further object of the present invention to desorb hydrocarbons from molecular sieves without employing unduly high temperatures, and in addition achieve the advantages of a substantially isothermal operation. Isothermal operation is possible because the heat of adsorption of the n-paraffins and low boiling olefins are approximately equal.

A still further object of the present invention is to provide a means of adsorbing straight chain paraffinic compounds and desorbing them with olefinic compounds in a manner whereby compression of vapor in recycle streams are substantially avoided and large economic savings and advantages are realized.

It is a still further object of the present invention to provide a means of desorbing straight chain aliphatic hydrocarbons from molecular sieves whereby improved hydrocarbon feed stream for petroleum refinery processes are obtained.

Other and further objects of the present invention will appear in the following more detailed description and claims.

In accordance with the present invention, fractionation of the desorbate stream is avoided by the use of a particular adsorption technique. A high boiling hydrocarbon, preferably a cut that is normally put into the gasoline pool, is employed as a wash oil to scrub the isoparaffins and other non-normal constituents from the desorbate streams. The remaining olefin is then pure enough for direct reuse in desorption. In this way, the cost for separating the olefin from the effluent is substantially reduced, and, by use of a gasoline component for the wash oil, recovery problems and the necessity for recycle are avoided.

The relationship between the olefin desorbent, the paraffin desorbed, and the preferred desorbing temperature are shown in the table below:

| Olefin | Paraffin | Preferred Temp.,°F. |
|---|---|---|
| $C_2$ | $C_3$–$C_5$ | 0–100 |
| $C_3$ | $C_6$–$C_8$ | 100–400 |
| n-$C_4$ | $C_8$–$C_{12}$ | 300–500 |

In one embodiment of the invention, a mixed branched-chain and cyclic/straight chain material, such as virgin naphtha, boiling in the $C_6$–200° F. range may be passed through a bed of molecular sieves, having pores of about 5 A. until just before normal paraffins appear in the effluent. Thereupon, without changing the temperature of the molecular sieve bed, an olefin-containing gas stream, preferably containing propylene, is passed through the bed until the paraffin has been substantially displaced. Thereafter, the cycle is repeated.

The process of the present invention may be understood more clearly when read in conjunction with the drawing.

The figure is a flow plan representing a simple adsorption-desorption cycle including the heavy wash oil separation technique.

Turning now to the figure, there is shown an adsorption column 16, containing the molecular sieve adsorbent. The size of the pore diameter depends upon the molecular size of the material to be separated. It must be large enough to adsorb the straight chain but not large enough to adsorb the branched chain isomers. The adsorptive capacity and pore size of the sieve, and the structure of the hydrocarbon are related in the following manner:

| Adsorbed on 4 A. and 5 A. | Adsorbed on 5 A. but not 4 A. | Not adsorbed on 4 A. or 5 A. | Adsorbed on 13 A. |
|---|---|---|---|
| (1) Ethane. | (1) Propane and higher n-paraffins. | (1) Iso-paraffins. | (1) All hydrocarbons within gasoline boiling range. |
| (2) Ethylene. | (2) Butene and higher n-olefins. | (2) Aromatics. | (2) Aromatics strongly adsorbed. |
| (3) Propylene. | | (3) All cyclics with 4 or more atoms in ring. | (3) Diolefins strongly adsorbed. |

In general, when it is desired to increase the octane rating of naphthas and hydrocarbon streams boiling in the gasoline range, sieves having a pore diameter of 5 A. are satisfactory.

A motor fuel prepared by the hydroforming of a hydrocarbon fraction, and boiling in the range of $C_6$–200° F., containing substantial amounts of naphthenes and aromatics as well as a minor proportion of normal paraffins is employed as feed in one embodiment of the invention. Because of the presence of the normal paraffins, the octane number of the hydroformate is relatively low, and may vary from 85 when the feed contains about 15–20% paraffins to about 95 when this is reduced to 8–10%. A feed of this type, which may contain small amounts of moisture or sulfur compounds, is introduced into the desorption system through line 2, and may be passed through preliminary feed purification zones 8 or 10. The feed may be preheated to a temperature of 200° to 400° F. This preheat is preferably accomplished by heat exchange with effluent from the adsorption step. Zones 8 and 10 contain a molecular sieve material such as 5 A., 4 A. or less. It has been found that the capacity of sieves to adsorb hydrocarbons is greatly reduced if water is present, even in small quantities, since it is more strongly adsorbed than most hydrocarbons. Certain sulfur compounds are also selectively adsorbed and difficult to desorb. Since most hydrocarbon streams available in a refinery contain small amounts of these impurities, the continued use of the sieves in such separation operations may necessitate periodic interruptions to desorb the contaminants and restore adsorbent capacity. With the use of the 4 A. type sieve, contaminants are removed but the hydrocarbons are not adsorbed. Since the capacity of the sieves for water is high, zones 8 and 10 prevent water from getting into tower 16. In the drawing, two such water adsorption systems are employed in drying and regeneration cycles so as to make the hydrocarbon separation continuous. Each of the systems in turn may comprise two alternate zones, the feed being switched from 8 to 10 when zone 8 requires regeneration. The latter is accomplished by sweeping out the water with hot gases such as air. It is understood, however, that a clean, dry feed, or one that is substantially sulfur-free, may not require this purification treatment.

The hydrocarbon feed is now passed, preferably in the vapor phase at a temperature of about 200° to 400° F. into adsorption tower 16. The adsorbent, which may be any natural or synthetic zeolite of the molecular sieve type heretofore described, may be arranged in trays, or packed on supports or be unsupported. Reaction conditions within adsorber are flow rates of 0.1–5 v./v./hr., temperatures of 175°–350° F., and pressures of 5 to about 100 p.s.i.g. High pressures cause non-selective adsorption in some cases. In order to avoid or minimize the need for subseqent propylene recycle compression, the adsorption step is preferably carried out at a higher pressure than the desorption step.

The substantially straight chain paraffin-free naphtha is withdrawn from tower 16 and passed via line 17 and cooler 25 to an accumulator, from where it may be withdrawn for blending or for direct employment as a high octane motor fuel. The initial first cycle adsorbate is free from the desorbent, and thus does not require the washing or scrubbing treatment of the invention.

When the sieve becomes nearly saturated with n-paraffins and does not give complete removal of them, as determined by conventional means such as refractive index, gravity or spectrographic analysis of the effluent, the flow of hydrocarbon feed through line 2 is halted and the desorption cycle begins. An olefin-containing gas, preferably one comprising a substantial proportion of propylene, and preheated to 200° to 400° F. is passed through line 1, dried if desired in purifiers 7 or 9 containing the same or similar sieve type as in zones 8 and 10, and passed into tower 16. Cracked refinery gases, containing besides propylene, minor amounts of ethane and propane and butylene may be used for this purpose. Without changing the temperature of the tower 16 appreciably, the desorbing gas replaces the paraffins adsorbed on the sieves with the olefins. The pressure, however, is decreased so that, during the desorption cycle, it is in the range of 0 to 20 p.s.i.g. This alternate high pressure adsorption and low pressure desorption eliminates or minimizes the need for recycle olefin compression. A good method for depressuring after the adsorption step is to vent the vapors from vessel 16 to drum 42 maintained just below the desorption pressure, where the vapors are quenched with cold feed.

The paraffinic constituents of the sieve are displaced by the light olefinic desorbing gas. The latter is of lower molecular weight than the naphtha, since the zeolites have a substantially greater affinity for olefins than for paraffins of the same number of carbon atoms. However, some of the olefins may also break through, and separation of olefin from n-paraffin is therefore required. The desorbed n-paraffins are withdrawn through line 18, cooled in cooler 26, and passed to accumulator-separator 20. The olefinic desorbent gases may be withdrawn through line 24 and may be recycled or employed as desired. The n-paraffin produced from line 22 may be isomerized, aromatized or reformed, all in a manner known per se. At the end of the desorption cycle, adsorption is resumed.

The vessel 16 is repressured to the adsorption pressure of 10 to 100 p.s.i.g. This may be readily accomplished by diverting part of the vaporized feed. During this pressuring step, an incremental feed stream may be added to the feed just upstream of the drier to minimize fluctuation in the feed going to vessel 16.

The olefins are now in turn desorbed by the n-paraffins. Effluent from vessel 16 now withdrawn through line 17 comprises a mixture of n-paraffin-free hydrocarbons plus propylene. This mixture must be resolved into its components. In accordance with one embodiment of the present invention, it is passed through a partial water-cooled condenser 25 and the partially condensed product passed to separator 23. A portion of the heavier isoparaffins may be separated as a liquid at this stage and passed via line 29 to stripper 31. Here, reboiled n-paraffin-free hydrocarbons are used to strip out any light olefins, and these are returned via lines 37 and 27 to vessel 28. The product withdrawn through line 33 is high octane isoparaffins and/or cyclic hydrocarbons, free of propylene desorbent.

Returning now to the main stream, a mixture of uncondensed isoparaffins, aromatics, naphthenes and the like, along with the olefin desorbent is passed upwardly through line 30 into absorber 32. Countercurrently, a liquid stream of wash oil, preferably a constituent of a gasoline pool, is admitted through line 34 and passed downwardly. The scrubbing medium may be a heavy hydroformate or other heavy stream such as alkylate, or a catalytic naphtha cut. A preferred scrubbing medium is catalytic reformate boiling about 270° F. This material is composed almost entirely of xylene and heavier aromatics. Heavy naphtha from catalytic cracking can also be used.

The unabsorbed propylene is withdrawn through line 36 and may, without substantial repressuring, be recycled to a second adsorption column 16' which is being desorbed. The operating pressures are chosen to eliminate the propylene recycle compressor normally required. The wash oil containing the n-paraffin-free product is withdrawn downwardly through line 38 and may be passed directly to the gasoline pool if the scrubbing medium is itself a desired gasoline constituent. On the other hand, if a heavier composition such as gas oil is employed as a scrubbing medium, the isoparaffins, etc., are separated from the mentsruum in a stripping zone and the heavy hydrocarbon recycled.

As has been pointed out, the need for compression of recycle gases is further minimized or substantially avoided by carrying out the adsorption step at a significantly higher pressure than the desorption step within critical pressure ranges. Above about 100 p.s.i.g., adsorption becomes non-selective, and desorption at less than atmospheric pressure results in uneconomical operation. The difference in pressure between the adsorption and the desorption step is determined by the pressure drop through the desorbent-isoparaffin product separation system described.

A convenient and preferred means of depressuring and repressuring the molecular sieve zone is as follows:

After the adsorption step has been completed, valve 50 is opened and the vapors contained within adsorption column 16 are allowed to flow through lines 40 and 44 into quench vessel 42 maintained at a temperature corresponding to a pressure just below the preferred desorption pressure. In the case of a $C_6/200°$ F. light virgin naphtha, the temperature would be 175° F. at a pressure of 4 p.s.i.g. This temperature is maintained by mixing cold feed with the hot vapors removed from the adsorption column. The hot vapors from the adsorption column and the cold liquid feed may be contacted in any conventional manner such as jets, packed columns, disc-and-doughnut columns, and the like.

After the desorption step, column 16 is repressured with a portion of the feed which has been brought to the adsorption pressure in the liquid state by means of a conventional liquids pump (not shown). During this time, additional liquid is added to the feed from vessel 42 through line 46 so as not to interfere with the normal amount of feed going to the adsorption step.

It is understood, however, that the present invention may be employed in systems, though not as conveniently, where the adsorption and desorption pressures are similar.

The process of the present invention may be modified in many respects and still be within the scope thereof. Butenes may also be employed advantageously as desorbing agents as well as propylene, particularly, for higher molecular weight paraffins. The separations may be employed for substantially any feed containing straight chain compounds such as n-paraffins, the sieve pore diameter being chosen in accordance with the molecular size. Though a fixed-bed operation has been described, the separation cycles may also be carried out by means of the so-called fluidized solids technique in fluidized beds or by moving bed techniques. The process of the present invention is particularly adapted to be employed in association with various means for upgrading virgin naphthas to form high octane motor fuels. As pointed out, the process is advantageously employed in connection with a fluid or fixed bed hydroforming operation wherein naphthas are treated at elevated temperatures and pressures in the presence of a catalyst such as platinum with hydrogen under conditions to convert a substantial portion of the hydrocarbons present to aromatics. The resulting hydroformate is then enhanced in octane value by removal of n-paraffins by the sieves. The adsorbate may then be recovered in accordance with the process of the present invention and recycled to the hydroformer for further conversion, or isomerized.

Furthermore, the heavy hydrocarbons may be introduced through line 37 prior to passage through product condenser separator 28. This has the advantage of eliminating tower 32. The total product is now passed downwardly through stripper 31, and the heavy hydrocarbon n-paraffin-free product withdrawn through line 33.

A particular desirable manner of operating vessel 16 is to reverse the flow stream, i.e. feeding into the vessel during the adsorption cycle at the opposite end from that where the desorbent is fed during the previous cycle. This technique, in combination with stopping short of breakthrough, provides a buffer zone of sieves, and prevents n-paraffins from mixing with the n-paraffin-free product.

In one modification, molecular sieves are used in the separation of n-paraffins from a catalytically reformed light virgin naphtha. In one case a 93 octane number reformate was treated with 5 A. sieve to give the following results:

Yield, vol. percent on reformate _____ 86.5
Res. Octane No. _____ 101

In addition, a 13.5% yield of n-paraffins was recovered which is available for reprocessing. If the virgin naphtha had been reformed to 101 RON (road octane number), the yield on virgin naphtha would have been 58%. First reforming, then separating the n-paraffins with a 5 A. sieve gives a yield of 63%, assuming discard of the n-paraffins. The total combination yield of 101 RON gasoline may be increased to 69% by reforming or isomerizing the n-paraffins. Thus, in this case, catalytic reforming to 93 RON plus a 5 A. molecular separation to improve the reformate octane rating, leads to 5 to 10% higher yields than severe reforming to the same octane level.

The high octane product resulting from sieve separations contain 0 to 2% n-paraffins depending upon operating procedure. The lower paraffin contents are obtained by stopping adsorption short of massive breakthrough. In order to keep the n-paraffin content to values below 1%, it is necessary that the feed and desorbent streams enter opposite ends of the bed. This overcomes the possibility of immediate n-paraffin breakthrough due to buildup in a zone where the desorbent concentration is low. It is also necessary to use a minimum of one liquid volume of desorbent to replace one liquid volume of n-paraffins. Use of less desorbent will not sufficiently remove the adsorbed n-paraffins and will cause gradual increase in n-paraffin content of the high octane product stream, for a given set of operating conditions.

Adsorption at higher pressure than desorption, and the use of one liquid volume of desorbent to one liquid volume of n-paraffin, contributes to elimination of the need for recycle compression. The molecular sieve bed provides desorbent capacity and the pressure difference provides the driving force necessary to recycle the desorbent stream. Where equilibrium considerations require the use of greater amounts of desorbent, partial recycle compression is needed. Only the desorbent which breaks through with the n-paraffins during desorption need be compressed for recycle. The rest of the stream is stored in the molecular sieve bed. The amount of propylene needed for desorbing $C_5$ to $C_7$ n-paraffins varies from one to three liquid volumes per liquid volume of n-paraffins. The amount of butylene needed is somewhat less. The greater the quantity of desorbent used, the greater will be the useful capacity of the sieve.

The quantity of high octane product taken overhead in the desorbent stream can be set by the adsorption equipment design. It is necessary and practical to reduce this potential loss to negligible amounts. The quantity lost may range from 0.05 to 2% on feed. The lower quantities may be obtained by adequate heavy wash oil coupled with sufficient contacting stages. The use of a gasoline component stream for absorption readily provides sufficient wash oil and eliminates the need for wash oil recovery. This combination allows almost 100% recovery of the high octane product.

Some cyclic and branched chain hydrocarbons may be adsorbed in the molecular sieve bed at elevated pressures. The mechanism involved may be adsorption on the molecular sieve binder, adsorption on the crystal surface, or adsorption in the crystal cavity due to momentary or permanent expansion of the pore openings. This non-selective adsorption is not important up to pressures of about 3 to 4 atmospheres, and the normal paraffin stream contains only small amounts of the desired gasoline components. The use of low pressures will keep this loss to 0 to 2% on feed. Very low losses can be obtained by depressuring the adsorption vessels by direct quench with cold feed. The cyclic and branched chain hydrocarbons which are adsorbed will desorb first during depressuring and be recycled with the feed.

Three or more reactor vessels, identical to vessel 16, are used to allow a continuous processing scheme. At all times, one or more vessels are being used for adsorption, one or more are being used for desorption, and one or more are available for pressuring or depressuring. Additional spare vessels may be used where periodic regeneration of the molecular sieve is desirable.

What is claimed is:

1. In a process for the separation of straight chain hydrocarbons from a feed mixture boiling in the gasoline boiling range and containing non-normal paraffin constituents by contacting said mixture with molecular sieves in an adsorption zone whereby said straight chain hydrocarbons are selectively adsorbed and said non-normal paraffin constituents unadsorbed, and wherein said molecular sieves are desorbed with an olefin comprising gas and said olefin comprising gas is itself adsorbed, and wherein said olefin containing gas is in turn desorbed by straight chain hydrocarbons present in said hydrocarbon mixture again fed to said adsorption zone, and a stream comprising said olefins and non-straight chain hydrocarbons unabsorbed from said feed mixture is withdrawn from said zone, the improvement which comprises scrubbing said stream with a hydrocarbon fraction boiling in the gasoline range, and recycling unadsorbed olefins to said zone.

2. The process of claim 1 wherein said scrubbing medium is a catalytic reformate boiling above about 270° F.

3. The process of claim 1 wherein said olefin is a propylene comprising gaseous fraction.

4. The process of claim 1 wherein said scrubbing medium and adsorbed hydrocarbons are passed directly to a gasoline pool.

5. An improved process for separating straight chain paraffinic hydrocarbons from mixtures with non-straight chain hydrocarbons boiling in the gasoline boiling range which comprises passing a vaporized stream of said mixture into a molecular sieve adsorption zone, said molecular sieves having a pore diameter of about 5 Angstrom units, maintaining a temperature in said zone of from about 175° to about 400° F. in said zone, maintaining a pressure of from about 5 to about 100 p.s.i.g. in said zone, withdrawing unadsorbed non-straight chain hydrocarbons from said zone while adsorbing straight chain hydrocarbons, thereafter decreasing the pressure in said zone to desorption pressures, passing a propylene comprising gas into said zone whereby normal paraffins are desorbed and said propylene adsorbed, maintaining a pressure of from about 5 to 20 p.s.ig. in said zone during said desorption step, said pressure being lower than during the adsorption step, withdrawing said normal desorbed hydrocarbons, thereafter repressuring said molecular sieve containing zone to adsorption pressures, passing said first named vaporized mixture into said zone, whereby said propylene is desorbed, passing said propylene and unadsorbed non-normal hydrocarbons into a scrubbing zone, scrubbing said material with a hydrocarbon fraction boiling in the gasoline range, and recycling unadsorbed propylene to said molecular sieve contacting zone.

6. The process of claim 5 wherein said zone is depressured immediately following said adsorption stage by passing at least a portion of the vapors from said zone to a quenching zone, quenching said vapors with cold feed at a temperature corresponding to a pressure below the desired desorption pressure, and recycling said quenched product to said molecular sieve zone until desorption pressure obtains within said zone.

7. The process of claim 5 wherein said molecular sieve zone is repressured after the desorption cycle to adsorption pressures by passing a portion of the liquid feed at adsorption pressures to said zone.

8. The process of claim 5 wherein said vaporized mixture is a naphtha fraction boiling in the range of $C_6$ to 200° F. and said adsorption-desorption temperature is in the range of 200–400° F.

9. The process of claim 5 wherein said scrubbing medium is a catalytic reformate rich in aromatics and boiling above about 270° F.

References Cited in the file of this patent

UNITED STATES PATENTS

| | | |
|---|---|---|
| 2,522,426 | Black | Sept. 12, 1950 |
| 2,530,300 | Hirschler | Nov. 14, 1950 |
| 2,586,889 | Vesterdal et al. | Feb. 26, 1952 |
| 2,628,933 | Eagle et al. | Feb. 17, 1953 |
| 2,745,889 | Johnston et al. | May 15, 1956 |
| 2,818,137 | Richmond et al. | Dec. 31, 1957 |
| 2,818,449 | Christensen et al. | Dec. 31, 1957 |
| 2,818,455 | Ballard et al. | Dec. 31, 1957 |